us008999275B2

(12) United States Patent
Larsson (10) Patent No.: US 8,999,275 B2
(45) Date of Patent: Apr. 7, 2015

(54) METHOD FOR MONITORING A CLEANING OF A PROCESS GAS (75) Inventor: Mikael Larsson, Mölndal (SE)

(73) Assignee: ALSTOM Technology Ltd, Baden (CH)

(*) Notice: Subject to any disclaimer, the term of this patent is extended or adjusted under 35 U.S.C. 154(b) by 0 days.

(21) Appl. No.: 14/238,407

(22) PCT Filed: Aug. 9, 2012

(86) PCT No.: PCT/IB2012/001538
§ 371 (c)(1),
(2), (4) Date: Mar. 3, 2014

(87) PCT Pub. No.: WO2013/024329
PCT Pub. Date: Feb. 21, 2013

(65) Prior Publication Data
US 2014/0199224 A1 Jul. 17, 2014

(30) Foreign Application Priority Data
Aug. 12, 2011 (EP) .................................. 11177421

(51) Int. Cl.
*B01D 53/50* (2006.01)
*B01D 53/78* (2006.01)
*G05B 21/00* (2006.01)
(Continued)

(52) U.S. Cl.
CPC ............... *B01D 53/504* (2013.01); *Y02E 50/12* (2013.01); *B01D 53/30* (2013.01); *B01D 53/346* (2013.01); *B01D 2259/126* (2013.01)

(58) Field of Classification Search
CPC ......... B01D 53/50; B01D 53/78; G05B 21/00

USPC ............... 423/242.1, 243.01, 243.08, DIG. 5; 422/108, 110, 111, 168, 169, 170
See application file for complete search history.

(56) References Cited

U.S. PATENT DOCUMENTS

| 4,164,547 A | 8/1979 | Simko |
| 5,601,784 A * | 2/1997 | Glover et al. ................... 422/70 |
| 5,620,144 A | 4/1997 | Strock et al. |

(Continued)

FOREIGN PATENT DOCUMENTS

| DE | 197 52 470 | 6/1999 |
| EP | 0 900 586 | 3/1999 |

(Continued)

OTHER PUBLICATIONS

International Search Report and Written Opinion of the International Search Authority for PCT/IB2012/001538 mailed Nov. 2, 2012.

*Primary Examiner* — Timothy Vanoy
(74) *Attorney, Agent, or Firm* — Rita D. Vacca (57) ABSTRACT The present disclosure is directed to a method for monitoring a cleaning of a process gas passing through a wet scrubber. The wet scrubber comprises an inlet zone, a contact zone and an outlet zone. The contact zone is divided into at least two sections. The method comprises measuring a concentration of sulphur dioxide in at least a first measuring point corresponding to a first section of the at least two sections of the contact zone to obtain measurement information; and comparing the measurement information to a reference value to determine a local sulphur dioxide removal performance of the first section.

21 Claims, 7 Drawing Sheets

(51) Int. Cl.
   *B01D 53/30*   (2006.01)
   *B01D 53/34*   (2006.01)

(56) References Cited

U.S. PATENT DOCUMENTS

| 5,788,944 A | 8/1998 | Kikkawa et al. |
| 2004/0096390 A1 | 5/2004 | Kobayashi et al. |
| 2005/0097941 A1 | 5/2005 | Sandvik et al. |

FOREIGN PATENT DOCUMENTS

| JP | 62-227425 A | * | 10/1987 | ................. 423/242.1 |
| JP | 62-298427 | | 12/1987 | |
| JP | 5-38416 A | * | 2/1993 | ................. 423/242.1 |
| JP | 6-182148 A | * | 7/1994 | ............... 423/243.08 |
| WO | 03/004137 | | 1/2003 | |

* cited by examiner

METHOD FOR MONITORING A CLEANING OF A PROCESS GAS

CROSS-REFERENCE TO RELATED APPLICATIONS

This is a US National Phase application claiming priority to International Application No. PCT/IB2012/001538 having an International Filing Date of Aug. 9, 2012, which in turn claims priority to European application 11177421.2 filed Aug. 12, 2011, both of which are incorporated herein in their entireties.

TECHNICAL FIELD

The present invention relates to a method for cleaning and for monitoring a cleaning of a process gas passing through a wet scrubber.

The present invention further relates to a gas cleaning system for cleaning a process gas; and the use of such a system.

BACKGROUND ART

Sulphur dioxide is a gas formed by oxidation of materials containing sulphur, such as coal, oil, natural gas, industrial and domestic waste and peat. Sulphur dioxide can also be produced as a residual product in chemical processes, such as for instance in metallurgical processes. Usually, emitting large quantities of sulphur dioxide into the atmosphere is not allowed, and therefore some kind of cleaning is necessary. One example is flue gas cleaning in power plants and other combustion plants. The flue gas generated in the combustion process in such plants is usually cleaned by, inter alia, absorption of sulphur dioxide in an absorption liquid. The absorption liquid may contain, for instance, water and one or more of the substances lime, limestone, dolomite, sodium hydroxide solution and similar substances, which are suitable for absorption of sulphur dioxide.

WO 03/004137 discloses a method and a device for removing sulphur dioxide from a gas. In the method, the flue gas flows upwardly through an apertured plate having a flowing layer of an absorption liquid thereon. The absorption liquid flowing over the top surface of the apertured plate is collected and made to flow downwardly into a container. The flue gas to be cleaned firstly flows through a contact zone, where it is contacted with the absorption liquid flowing downwardly from the apertured plate, and secondly flows upwardly through the apertured plate.

U.S. Pat. No. 5,620,144 discloses a wet scrubber for removing sulphur dioxide from a process gas. The wet scrubber comprises a vertical tower in which a number of atomization nozzles are arranged for spraying of absorption liquid for the removal of sulphur dioxide from a process gas flowing through the scrubber.

It is difficult to determine the sulphur dioxide removal efficiency of such scrubbers according to prior art.

SUMMARY OF THE INVENTION

Purposes of the present invention include providing solutions to problems identified with regard to prior art.

The present method and gas cleaning system allow for measuring the local concentration of sulphur dioxide in the interior of a wet scrubber. Further, local sulphur removal efficiency can be determined in the interior of a wet scrubber. In addition, the present method and gas cleaning system allow for determining an action to be taken to regulate a local operating condition within internal sections of a wet scrubber.

The present method and gas cleaning system further make it possible to carefully plan operation downtime and maintenance. Yet further, the present method and gas cleaning system make it possible to enhance the control of any supply of absorption liquid to the inlet of a wet scrubber, which absorbent liquid can be supplied for reaction with sulphur dioxide for the purpose of reducing concentrations of sulphur dioxide in the process gas. According to a first aspect of the present invention, there is provided a method for cleaning and for monitoring a cleaning of a process gas passing through a wet scrubber, the wet scrubber comprising an inlet zone, a contact zone and an outlet zone. The contact zone is divided into at least two sections. The process gas flows through the inlet zone and further to the contact zone wherein the process gas is mixed with an absorption liquid. The absorption liquid upon contact with the process gas absorbs at least part of a sulphur dioxide content of the process gas. The process gas then flows out of the wet scrubber via the outlet zone. The subject method includes measuring the concentration of sulphur dioxide in at least a first measuring point corresponding to a first section of the at least two sections of the contact zone; and comparing the concentration of sulphur dioxide measured with respect to the first section to a reference value for determining a local sulphur dioxide removal performance of the first section.

In the following, the term "local operation condition" refers to the level of sulphur dioxide ($SO_2$) measured in a process gas, such as flue gas, for example from the combustion of coal, oil, natural gas, industrial and domestic waste and peat, for example in power plants. The process gas can be generated also, for example, during the production of metal from ore, such as aluminium from alumina, or other chemical or metallurgical processes.

The measuring of the concentration of sulphur dioxide in at least a first measuring point corresponding to a first section of the contact zone, provides measurement information as to the concentration of sulphur dioxide in that individual contact zone section. Thus, measurement information that allows fine tuning of the sulphur dioxide removal locally, or in individual contact zone sections, and inside the wet scrubber is provided. In addition, erroneous operation, dysfunctional equipment, or local contaminations of the wet scrubber can be identified more precisely, inside the wet scrubber. In order to determine the concentration of sulphur dioxide in a contact zone section, the measuring point does not have to be within that particular contact zone section. The measuring point may be positioned for example, before or after that particular contact zone section and still allow for a determination as to the sulphur dioxide concentration in that contact zone section. For example, in addition to experimental verifications of the accuracy between measurement information taken from a measuring point and actual measurements taken in a contact zone section, it is also possible to calculate or estimate sulphur dioxide concentrations for particular measuring points/contact zone section using measurement information. For example, with measurement information and suitable application of flow dynamics, such as calculating flow dynamics, the sulphur dioxide concentration can be calculated or estimated for a particular contact zone section.

By comparing the measured concentration of sulphur dioxide with an established reference value, it may be determined, for example, if the sulphur dioxide concentration in an individual contact zone section is too high; too low; within an acceptable margin or above a desired limit. It may, thus, be determined if there is a need for any action to regulate a local operation condition for that contact zone section. Thus, measurement information is useful to determine the need for any action with regard to any contact zone section individually, rather than for only the whole of the wet scrubber. In addition, measurement information makes it possible to carefully plan downtime and maintenance. Measurement information also makes it possible to monitor the need for, and provide necessary input data for, any cleaning operation.

Thus, the present system enables collection and evaluation of measurement information regarding local concentrations of sulphur dioxide inside a wet scrubber. Such allows one to thereby determine a need for action to regulate a local operating condition within a contact zone section or a need for locally controlling the absorption of sulphur dioxide.

Depending on the number of measuring points in view of, for example the number of nozzles in the case of a wet scrubber of the open spray tower type, it is possible to get measurement information for the local operation condition of, for example, an individual nozzle, or a group of nozzles, depending on the level of system specificity desired.

Further, the subject method makes it possible to carefully plan downtime and maintenance. It is also possible to monitor the need for and provide necessary input data for any associated cleaning operation.

Further, measurement information from the system can be used to provide necessary input data for control of any supply of absorption liquid.

According to one embodiment the contact zone is divided into at least two sections in a plane being perpendicular to a direction in which the process gas flows through the contact zone, Thus, for example, measurement information locally in the cross-section, or connected to the cross-section, is provided. Further, measurement information that allows fine tuning of the sulphur dioxide removal locally in the cross-section, or in connection to the cross-section is provided.

According to one embodiment the method may further comprise utilizing the result of the measurement information-reference value comparison to determine a need for action to regulate a local operating condition in a particular contact zone.

According to one embodiment the method may further comprise utilizing the local sulphur dioxide removal performance of the first section to determine a need for an action to regulate a local operating condition of the first section.

According to one embodiment, the needed action may be to regulate the local operating condition of a particular contact zone section by increasing or decreasing the amount of absorption liquid supplied to the contact zone section; increasing or decreasing the concentration of a reagent in the absorption liquid supplied to the particular contact zone section; increasing or decreasing an amount of process gas supplied to the particular contact zone section; and/or cleaning, replacing, or rebuilding equipment of the wet scrubber corresponding to the particular contact zone section.

According to one embodiment, the method may further comprise controlling the absorption of sulphur dioxide in the contact zone section based on the result of the measurement information-reference value comparison.

Thus, if it for example is determined that the concentration of sulphur dioxide is too high in the contact zone section, the sulphur dioxide removal efficiency may be increased in that section. As an additional example, it may be determined that the sulphur dioxide removal efficiency is within an acceptable margin or above a desired level, for which case it may be determined that no action is needed.

Controlling the absorption of sulphur dioxide in the contact zone section may be effected manually by an operator, and/or automatically by means of, for example, a computer or a controller.

According to one embodiment, controlling sulphur dioxide absorption may be achieved by at least one of: increasing or decreasing the amount of absorption liquid supplied to the contact zone section; increasing or decreasing the concentration of a reagent in the absorption liquid fed to the contact zone section; and increasing or decreasing an amount of process gas supplied to the contact zone section.

Thus, the sulphur dioxide removal efficiency of the section(s) of the contact zone may individually be increased or decreased. The sulphur dioxide removal in individual contact zone sections may also be turned on or off.

According to one embodiment, the absorption liquid is an aqueous liquid comprising a reagent, which reagent reacts with sulphur dioxide to form a precipitate comprising sulphur from the sulphur dioxide. The reagent may be limestone ($CaCO_3$), which forms calcium sulphite ($CaSO_3$) with the sulphur dioxide. The calcium sulphite may subsequently be oxidized to form gypsum ($CaSO_4$). The oxidation of calcium sulphite is preferably performed by using bubbling air or oxygen gas through the limestone absorption liquid. The gypsum may be removed from the liquid and used elsewhere. Hence, the absorption liquid may comprise, in addition to the limestone and water, also small amounts of calcium sulphite and, as a major constituent, gypsum. The absorption liquid may also be sea water.

According to one embodiment, the concentration of sulphur dioxide may be measured downstream of the contact zone section. As used herein, the terms "downstream" and "upstream" are provided as reference points with regard to the flow of the process gas through the wet scrubber. Hence, measuring sulphur dioxide downstream of the contact zone section means that the measurement is taken after the process gas flow has passed beyond the contact zone section. Such is the case since measurement of the sulphur dioxide concentration benefits from a drier measuring environment.

It is realised that the concentration of sulphur dioxide may optionally be measured in or in connection to at least one of the inlet zone, the outlet zone and the contact zone.

Measuring in the contact zone may be an efficient means of obtaining the concentration of sulphur dioxide in the contact zone, and may be an efficient means by which one may determine the local operating condition in the contact zone section(s). Measuring in the inlet zone, such as in the inlet pipe of the wet scrubber, may be an efficient way of measuring the concentration of sulphur dioxide entering the contact zone section(s). Such an inlet sulphur dioxide concentration may be used to determine, for example, the sulphur dioxide removal efficiency in that particular contact zone section, or the need for adjusting the sulphur dioxide removal efficiency in that or other contact zone section(s). Such uses may be determined by comparing the measured inlet sulphur dioxide concentrations with concentrations of sulphur dioxide flowing from contact zone section(s) or the wet scrubber. Measuring sulphur dioxide concentration in the outlet zone may be particularly efficient as the process gas may be less moist and contain less or no absorption liquid as compared to process gas in the contact zone. Measuring both in the inlet zone and in the outlet zone and comparing such measured concentrations of sulphur dioxide may be an efficient way of determining the sulphur dioxide removal efficiency in relevant contact zone section(s).

According to one embodiment, the reference value may be selected among: a concentration of sulphur dioxide in the process gas upstream of the wet scrubber; a concentration of sulphur dioxide in the process gas downstream of the wet scrubber; a concentration of sulphur dioxide in the contact zone measured in a measuring point corresponding to a second contact zone section of the at least two contact zone sections; or a predetermined value.

Reference values for process gas downstream of the wet scrubber may be obtained from global sulphur dioxide concentration measurements of the process gas flowing from the wet scrubber or of the process gas flowing in the chimney. Thus, a determination may be made as to whether or not operating conditions for a particular contact zone section requires modification to increase or decrease sulphur dioxide removal efficiency depending on if the result of the overall, or global, removal of sulphur dioxide is too low or too high. It may also be the case that the sulphur dioxide removal efficiency of one contact zone section may require an increase while the sulphur dioxide removal efficiency of another contact zone section require a decrease. Thus, the wet scrubber may be operated more efficiently by adjusting or controlling the sulphur dioxide removal efficiency of different contact zone sections individually.

Reference values for process gas downstream of the wet scrubber may be used as a basis for adjusting or controlling the sulphur dioxide removal efficiency of different individual contact zone sections based on measured sulphur dioxide concentrations of inflowing process gas.

Reference values for comparison of concentrations of sulphur dioxide measured in a measuring point for a second contact zone section, may be efficient for optimizing the overall sulphur dioxide removal efficiency, for example, by increasing the sulphur dioxide removal efficiency in contact zone sections where the efficiency is low and decreasing or not changing the removal efficiency in contact zone sections where the efficiency is high.

A predetermined reference value may for example be a defined concentration of sulphur dioxide in the process gas flowing from the wet scrubber. For example, a predetermined reference value may be related to or equal to the maximum allowable or desired emission value for the scrubber, in which case, the scrubber can be optimised to remove sulphur dioxide at a level of efficiency such that the reference value is not exceeded.

The outcome of the comparison of the measured sulphur dioxide concentration to the reference value can be used to determine at least the following three operation conditions: 1) concentration measured lower than the reference value=normal operation→no action required; 2) concentration measured about the same as the reference value=indication of forthcoming operational problems→decide on or schedule need for future action; 3) concentration measured higher than the reference value=detected local operational problem→decide on any immediate action or any action in the near future. It is to be understood that the outcomes proposed above are non-limiting examples of how the results of the comparison and determination made by the controller can be prosecuted.

According to one embodiment, the method may further comprise measuring the concentration of sulphur dioxide in at least a first, a second and a third measuring point corresponding to a respective first, second and third contact zone sections.

Further, according to another embodiment, the method may further comprise comparing the measured concentrations in the at least a first, a second and a third measuring points to a reference value to determine if action to modify a local operating condition in any of the first, second and third contact zone sections is necessary. Fur such a purpose, for example, the reference value may be the measured concentration in at least one of the first, second and third contact zone sections. Thus, for example, the measured concentration in the first contact zone section may be compared with the measured concentration in the second or third contact zone section.

According to one embodiment an action to modify the local operation condition may be through controlling sulphur dioxide removal efficiency by at least one of: increasing or decreasing the amount of absorption liquid supplied to the first section of the contact zone; increasing or decreasing the concentration of a reagent in the absorption liquid fed to the first section of the contact zone; and increasing or decreasing an amount of process gas flowing to the first section of the contact zone.

Thus, the sulphur dioxide removal efficiency of the individual section(s) of the contact zone may be independently increased or decreased. The sulphur dioxide removal method used in individual contact zone sections may also be turned on or off.

According to one embodiment, the wet scrubber may be a wet scrubber of the open spray tower type, wherein each of the at least two contact zone sections comprises at least one nozzle adapted for spraying absorption liquid.

An example of such a wet scrubber of open spray tower type is further described in the detailed description.

Preferably, the wet scrubber may comprise at least a first, a second and a third measuring point corresponding to a respective first, second and third sections of the contact zone, each of the contact zone sections comprises at least one nozzle, such as one to two nozzles, two to five nozzles, five to ten nozzles, or five to twenty nozzles.

The wet scrubber may comprise at least two contact zone sections, preferably two to twenty sections, and more preferably at least three sections, such as at least four sections, for example, three to twenty sections or four to twenty sections. Each of the contact zone sections may comprise at least one nozzle, such as one to twenty nozzles, for example two to twenty nozzles or three to ten nozzles.

According to an additional embodiment, the wet scrubber of the open spray tower type may further comprise at least one demister positioned downstream of the contact zone of the wet scrubber, wherein the measuring of the concentration of the sulphur dioxide takes place in a measuring point downstream of the demister. Such a demister removes absorption liquid from the environment in the wet scrubber.

According to an additional embodiment, the wet scrubber of the open spray tower type may comprise a first demister and a second demister arranged in series, wherein the step of measuring the concentration of the sulphur dioxide takes place in a measuring point downstream of the second demister. Such an arrangement may remove even more absorption liquid from the environment within the wet scrubber. As a result, measuring of the sulphur dioxide concentration may be more efficient due to the drier environment within the wet scrubber, which may be particularly advantageous for any sulphur dioxide sensitive detectors that may be negatively affected by moisture or absorption liquid.

According to one embodiment, the wet scrubber may be of a bubbling bed type of scrubber wherein the contact zone comprises: a plate with a plurality of apertures allowing a flow of process gas from the inlet zone to the outlet zone. In such a scrubber, each one of the contact zone sections comprises at least one of the apertures formed through the plate with a layer of absorption liquid flowing over the upper side of the plate.

An example of such a wet scrubber of a bubbling bed type is further described in the detailed description below.

For the wet scrubber of bubbling bed type, any action to be taken to regulate the local operating condition of a section may be at least one of: executing cleaning of the wet scrubber; removing or replacing equipment in the wet scrubber; increasing or decreasing the supply of absorption liquid within the wet scrubber; and increasing or decreasing the amount of process gas flow through the wet scrubber.

If it is determined for example that the removal of sulphur dioxide from the process gas is locally too low, it may be the result of the flowing layer of absorption liquid being unevenly distributed over the contact zone section. Uneven absorption liquid distribution may refer to, for example, a flowing layer of absorption liquid with an uneven thickness, or the absorption liquid not flowing over the entire upper surface of the plate.

According to an additional embodiment, with a wet scrubber of a bubbling bed type, the step of measuring the concentration of sulphur dioxide may comprise measuring in at least one measuring point located vertically above the upper side of the plate.

According to one embodiment, the wet scrubber may further comprise at least one sulphur dioxide detecting sensor positioned in measuring points for measuring the concentration of sulphur dioxide. Thus, for example, at least one sulphur dioxide detecting sensor may be positioned in each one of the measuring points.

Thus, the concentration of sulphur dioxide in the measuring point(s) may be determined. Such a sulphur dioxide sensitive detector may, for example, be selected from Siemens Ultramat 23, or the gas sensor device disclosed in US 2005/0097941, or any other similar or suitable detector or sensor. The number of sensors required can be determined based on factors such as the type of sensor used.

According to one embodiment, the wet scrubber may further comprise at least one sulphur dioxide detecting sensor, and at least one collector, the method further comprising the step of: collecting process gas from the at least one measuring point by means of the at least one collector and transporting the process gas to the at least one sulphur dioxide detecting sensor.

Thus, the sensor may be positioned a distance from the measuring point, such as in an environment suitable for the sensor. The collector may be, for example, a pipe or a tube for sampling process gas from the measuring point. The sampling may be realised, for example, by means of a pump or vacuum used to cause movement or a flow of process gas through the tube or pipe.

According to another embodiment, the at least one sulphur dioxide detecting sensor may be positioned outside the wet scrubber.

According to a second aspect, there is provided a gas cleaning system for cleaning of a process gas, comprising a wet scrubber adapted for separating sulphur dioxide from the process gas flowing through the wet scrubber by means of an absorption liquid supplied to the wet scrubber; at least one sulphur dioxide detecting sensor; and at least a first measuring point; wherein the wet scrubber comprises an inlet zone, a contact zone and an outlet zone. As such, the subject wet scrubber is adapted to allow flow of the process gas via the inlet zone through the contact zone. Within the contact zone, the process gas is mixed with absorption liquid prior to flowing out of the wet scrubber via the outlet zone. The contact zone is divided into at least two sections in a plane perpendicular to a direction of process gas flow through the contact zone. The first measuring point corresponding to a first section of the at least two sections of the contact zone, with at least one sulphur dioxide detecting sensor adapted to measure the concentration of sulphur dioxide in the first measuring point, is used to determine local sulphur dioxide removal performance of the first contact zone section.

Further, there may be provided a second measuring point corresponding to a second section of the at least two sections of the contact zone, with at least one sulphur dioxide detecting sensor adapted to measure the concentration of sulphur dioxide in the second measuring point.

According to one embodiment of the second aspect of the invention, the gas cleaning system may further comprise a controller operative for utilizing the measured concentration of sulphur dioxide in the first measuring point to determine need to modify a local operating condition in one of the at least two sections of the contact zone to which the at least one measuring point corresponds.

According to one embodiment of the second aspect of the invention, the controller may be adapted to determine a need to modify control of at least one local operating parameter of the wet scrubber in the first contact zone section.

As used herein, the term "modify" refers to a change in control of the removal of sulphur dioxide in at least one contact zone section.

According to one embodiment, the gas cleaning system may further comprise a control device useful for at least one of: increasing or decreasing the amount of absorption liquid supplied to the first section of the contact zone; increasing or decreasing the concentration of a reagent in the absorption liquid fed to the first section of the contact zone; and increasing or decreasing an amount of process gas flowing to the first section of the contact zone.

The control device may be controlled by the controller.

According to a third aspect, there is provided a use of the system according to the second aspect for determining a malfunction in the operation of one section of at least two sections of a wet scrubber.

Embodiments and discussions with regard to the first aspect may also be relevant with regard to the second and third aspects. References to these embodiments are hereby made, where relevant.

The above described aspects and other features are exemplified by the following figures and detailed description.

BRIEF DESCRIPTION OF THE DRAWINGS

The invention is described in more detail below with reference to the appended drawings in which.

It is understood that the detailed description below is intended to improve the understanding of the invention, and should not be interpreted as limiting the scope of the invention.

DESCRIPTION OF PREFERRED EMBODIMENTS

Figure 1:
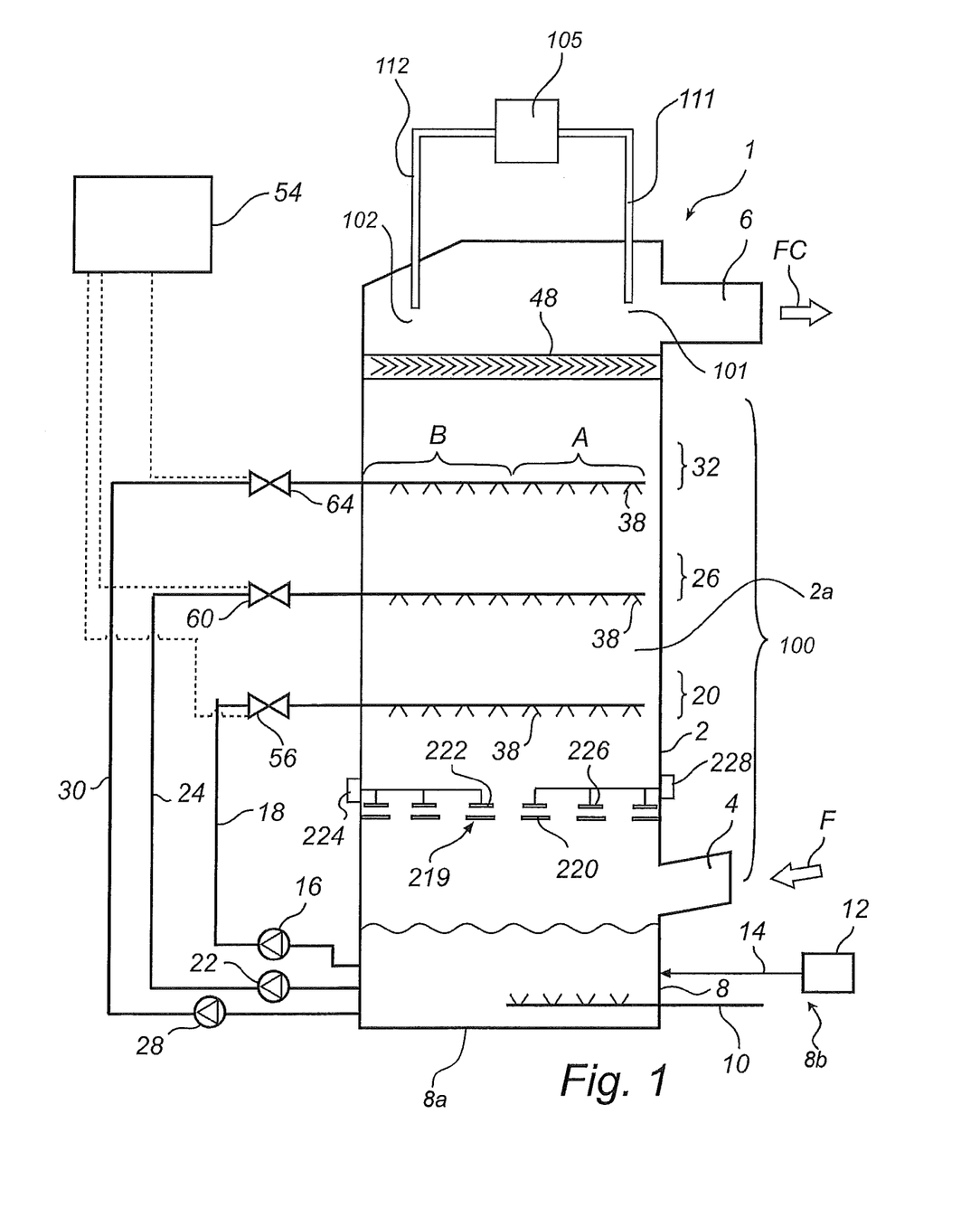
FIG. 1 is a schematic side cross sectional view of a wet scrubber of spray type.

FIG. 1 illustrates a wet scrubber 1 of the open spray tower type. The wet scrubber 1 is operative for removing at least a portion of the sulphur dioxide content of a process gas, in the form of a flue gas, F, generated in a boiler (not shown) operative for combusting a fuel, such as coal or oil.

The wet scrubber 1 comprises a vertical open tower 2 with an interior 2a, an inlet zone 4 for flow of flue gas, F, into interior 2a to be cleaned, and an outlet zone 6 for cleaned flue gas, FC, from which at least a portion of the sulphur dioxide content has been removed to flow from interior 2a.

An absorption liquid tank 8 is arranged at a bottom 8a of the vertical open tower 2. The absorption liquid tank 8 is provided with an oxidation arrangement 10. Fresh limestone ($CaCO_3$) is supplied to the absorption liquid tank 8 by an absorbent supply device 8b comprising a limestone storage 12 and a supply pipe 14. It will be appreciated that absorption liquid tank 8 may, as an alternative, be positioned outside of tower 2, and that the supply of limestone could, as an alternative, enter the wet scrubber 1 at other locations, as a dry powder, a slurry or both.

The wet scrubber 1 further comprises a first circulation pump 16 which circulates, in an absorption liquid circulation pipe 18, a limestone absorption liquid, sometimes referred to as a limestone slurry, from the absorption liquid tank 8 to a first spray level system 20 positioned vertically lowest within interior 2a of open tower 2. The wet scrubber 1 further comprises a second circulation pump 22 which circulates, in an absorption liquid circulation pipe 24, a limestone absorption liquid from the absorption liquid tank 8 to a second spray level system 26 positioned vertically intermediate within interior 2a of open tower 2, and a third circulation pump 28 which circulates, in an absorption liquid circulation pipe 30, a limestone absorption liquid from the absorption liquid tank 8 to a third spray level system 32 positioned vertically highest within interior 2a of open tower 2. The first spray level system 20 comprises a number of fluidly connected nozzles 38 that finely distribute limestone absorption liquid, circulated by the pump 16, to achieve effective contact between the limestone absorption liquid and the flue gas passing through the wet scrubber 1 and flowing substantially vertically upwards inside interior 2a of open tower 2. All or some of the nozzles 38 may, for example, be of the type 4CF-303120, available from Spraying Systems Co, Wheaton, Ill., USA.

The second spray level system 26 is similar if not identical to the first spray level system 20 and comprises a number of fluidly connected nozzles 38.

The third spray level system 32 is similar if not identical to the first and second spray level systems 20, 26 and comprises a number of fluidly connected nozzles 38.

A demister 48 is located above the third spray level system 32. The demister 48 removes at least a portion of the absorption liquid droplets entrained by the cleaned flue gas, FC.

In the wet scrubber 1, sulphur dioxide ($SO_2$), in the flue gas reacts with the limestone ($CaCO_3$) to form calcium sulphite ($CaSO_3$), which is subsequently oxidized to form gypsum ($CaSO_4$). The oxidation of calcium sulphite is preferably performed by bubbling air or oxygen gas through the limestone absorption liquid using oxidation arrangement 10. Hence, the limestone absorption liquid comprises, in addition to the limestone, also small amounts of calcium sulphite and, as a major constituent, gypsum. The gypsum formed through this process is removed from the interior 2a of wet scrubber 1. Dewatered gypsum may be commercially used, for example in wallboard production.

In addition to sulphur dioxide ($SO_2$) the wet scrubber 1 will remove, at least partly, also other contaminants from the flue gas. Examples of such other contaminants include sulphur trioxide ($SO_3$), hydrochloric acid (HCl), hydrofluoric acid (HF), and other acid contaminants. Still further, the wet scrubber 1 may also remove, at least partly, other types of contaminants from the flue gas, such as for example dust particles and mercury.

A control unit 54, or controller, controls the operating parameters of the wet scrubber 1. To this end, a control device in the form of a control valve 56 is provided on the first spray level system 20. Furthermore, in the second spray level system 26 a control valve 60 is provided. In the third spray level system 32 a control valve 64 is provided. The control unit 54 controls, individually, each of the control valves 56, 60, and 64.

Measuring points 101 and 102 are positioned downstream of the demister 48. Collectors 111 and 112 are in the form of tubes collecting gas from the measuring points 101 and 102 and transporting the gas to a sulphur dioxide detecting sensor 105. Thus, in this example a single sensor 105 serves a plurality of measuring points 101 and 102. It is realised that each measuring point 101 or 102 may as an alternative be connected to an individual sensor 105. Each measuring points 101 and 102 respectively corresponds to contact zone sections A and B. In addition, a sulphur dioxide concentration is measured upstream of the wet scrubber 1, not illustrated, and used for reference purposes as a reference value. During operation of the wet scrubber 1, the concentration of sulphur dioxide is measured in each measuring point 101 and 102. It is now assumed for the sake of the example, that the concentration of sulphur dioxide in sections A and B are determined to be 2 and 95 concentration units, respectively, and that the reference value is determined to be 100 concentration units. The concentration of sulphur dioxide measured with respect to sections A and B are now compared with reference value, for this example by calculating the ratios 2/100=0.02 and 95/100=0.95. It is concluded from the comparison between the measured concentrations and the reference value that action needs to be taken to modify the local operating condition of section B, in which section it is estimated that only 5% of the incoming sulphur dioxide has been removed. Concerning section A, it is for this example determined that no action needs to be taken to modify the local operating condition as it is estimated that 98% of the incoming sulphur dioxide has been removed. The action concerning section B may for example be to clean or replace the nozzles 38 corresponding to section B. In addition to measuring in points 101 and 102 measurements could have been made between the spray level systems 20 and 26, and/or 26 and 32, for which case it could have been concluded which of the spray level systems 20, 26, or 32 holds nozzles 38 needing cleaning or replacement.

In this example, with reference to FIG. 1, there is also provided a control device 219 comprising a perforated plate 220, a first perforated damper plate 222 controlled by damper actuator 224, and a second perforated damper plate 226 controlled by damper actuator 228. Thus, the restriction subjected to the flue gas F by means of the perforated plate 220 in combination with the perforated damper plates 222 and 226 may be adjusted and controlled locally such that the flow of flue gas F reaching sections A and B may be independently adjusted or controlled. Thus, if it is determined that the sulphur dioxide removal efficiency is lower in one section, less flue gas F is allowed to flow to that section, while more flue gas F is allowed to flow to the other sections with higher sulphur dioxide removal efficiency. The control device 219 may be connected to control unit 54.

As an alternative to the spray system in the illustrated wet scrubber 1, a packed structured bed (not shown), or a trickling bed (not shown), corresponding to the contact zone 100 with nozzles 38, may provide an efficient contact zone. For such a purpose, a pump may pump absorption liquid on top of the bed. For such a purpose it may be efficient to use sea water as absorption liquid.

Figure 2:
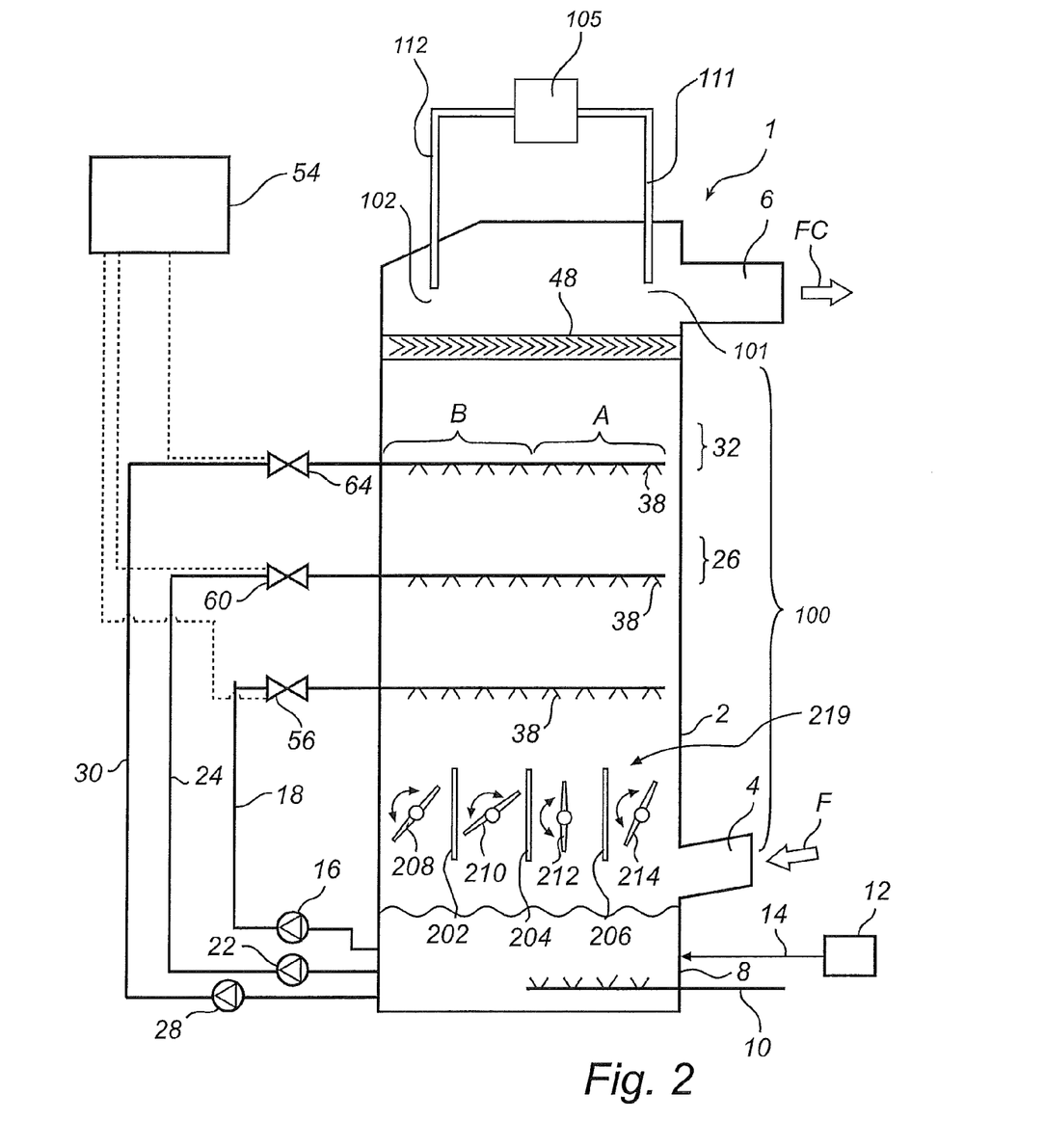
FIG. 2 is a schematic side cross sectional view of a wet scrubber of spray type.

With reference to FIG. 2 a wet scrubber 1 of the open spray tower type is discussed. The wet scrubber 1 of FIG. 2 is identical to the wet scrubber 1 discussed with reference to FIG. 1, with the only exception of the control device 219. The control device 219 controls the amount of flue gas F to the sections A and B. The control device 219 comprises four dampers 208, 210, 212, and 214 arranged between three guiding vanes 202, 204, and 206. It is realised that the control device 219 also could function without the dampers 208, 210, 212, and 214. The control device 219 may act to control the amount or flow of flue gas flows to each individual section A and B. Although not illustrated the control device 219 may also be positioned in the inlet zone 4 of the wet scrubber 1.

Figure 3A:
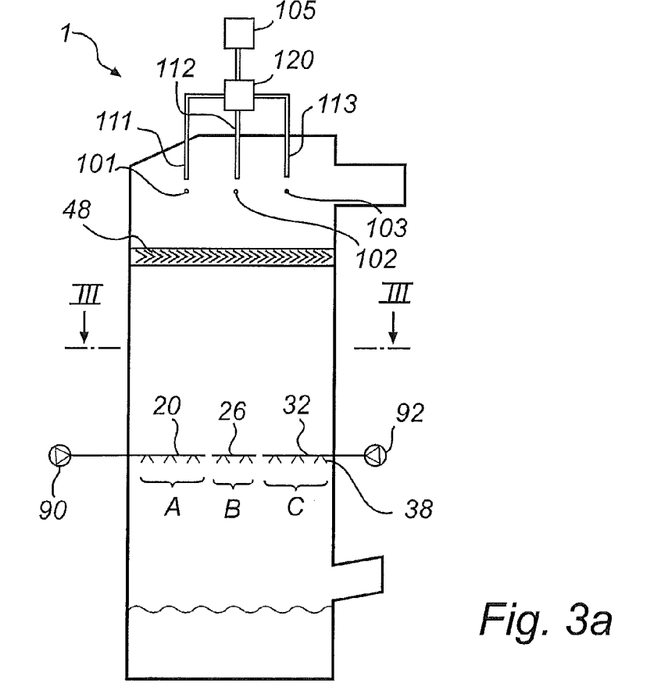
FIG. 3a is a schematic side cross sectional view of a wet scrubber of spray type.
Figure 3B:
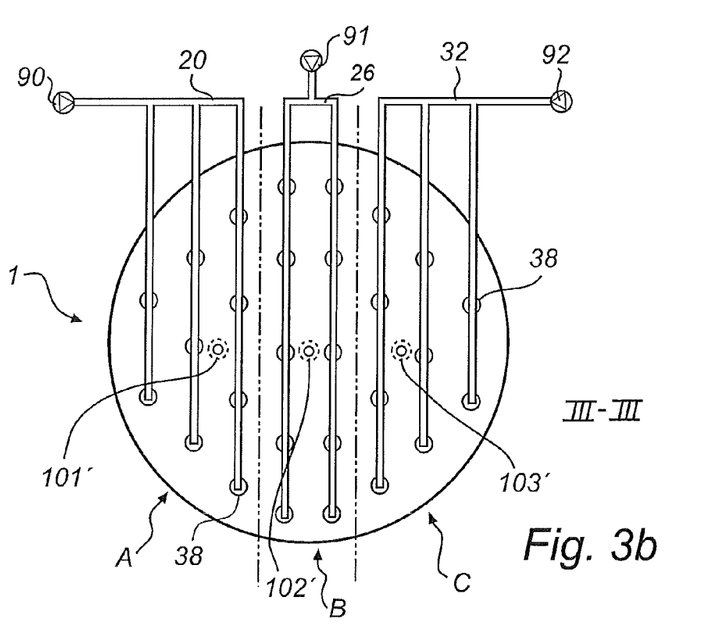
FIG. 3b is a schematic top cross sectional view of the scrubber in FIG. 3a taken along line III-III.

With reference to FIGS. 3a and 3b another embodiment is illustrated. FIG. 3a illustrates a side cross sectional schematic view of the wet scrubber 1 while FIG. 3b illustrates a schematic top cross sectional view of the same wet scrubber 1 of FIG. 3a taken along line III-III directly under the demister 48. FIGS. 3a and 3b illustrate a wet scrubber 1 of the open spray tower type similar to the scrubber 1 discussed above with reference to FIG. 1 with exceptions including the spray arrangement, number of nozzles 38 and measuring points. For the sake of clarity, all details of the wet scrubber 1 are not illustrated in FIGS. 3a and 3b. Three measuring points 101, 102, and 103 are positioned downstream of the demister 48, the measuring points 101, 102 and 103 are thereby not present in FIG. 3b, but their respective positions are indicated as 101', 102', and 103'. Collectors 111, 112, and 113 are in the form of tubes collecting gas from the measuring points 101, 102, and 103 and channeling the gas to a sulphur dioxide detecting sensor 105, via a valve system 120. Measuring points 101, 102, and 103 correspond to sections A, B, and C of the contact zone respectively. Sections A, B, and C correspond to individual spray systems 20, 26, and 32, which supply absorption liquid by means of nozzles 38 and three individual pumps 90, 91, and 92. Each of the sections A, B, and C covers about a third of the horizontal cross section of the wet scrubber 1, perpendicular to a general direction of process gas flow through the wet scrubber 1. In this example the concentration of sulphur dioxide determined for each of the sections A, B, and C are compared with each other and it is determined whether or not the local operating conditions for any of the sections A, B, or C dictate any action. For example, if it is determined that the sulphur removal in section A is not sufficient, such may dictate action for the flow of absorption liquid to spray system 20 to be increased, for example by increasing the flow supplied by pump 90. At the same time, the flow of absorption liquid to the other spray systems 26 and 32 could be decreased.

Figure 4:
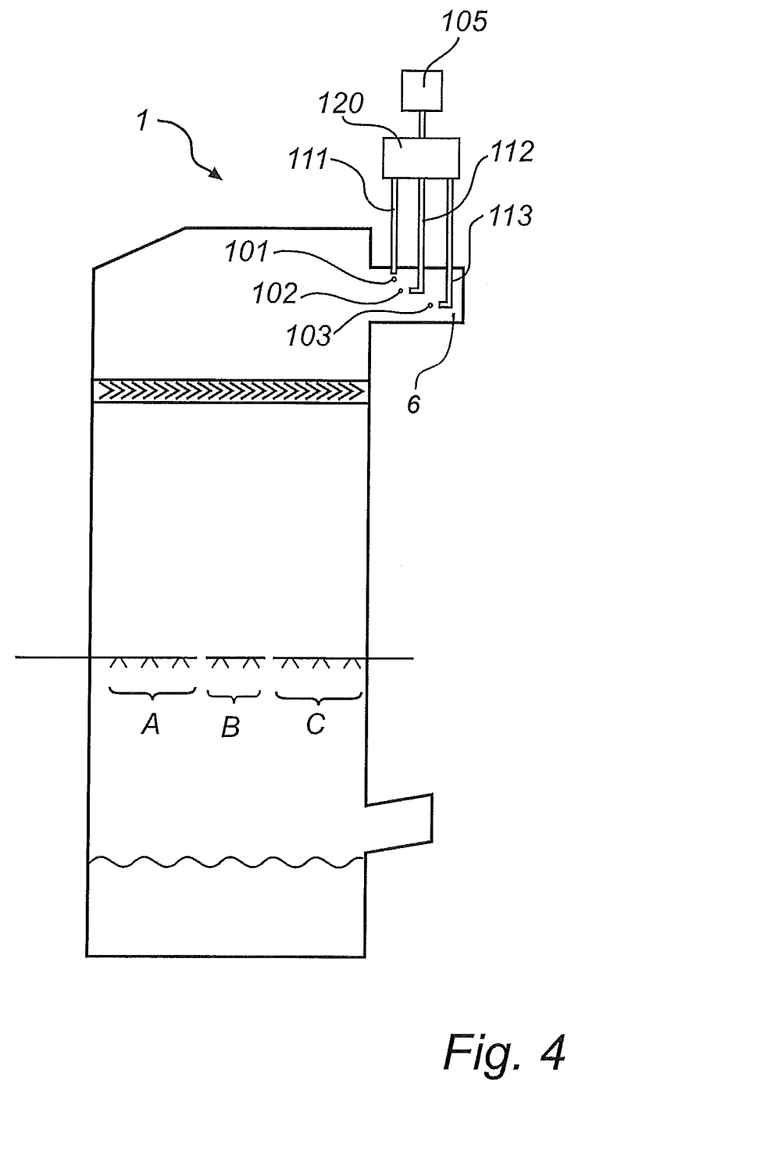
FIG. 4 is a schematic side cross sectional view of a wet scrubber of spray type.

With reference to FIG. 4 another embodiment is illustrated. FIG. 4 illustrates a wet scrubber 1 of the open spray tower type similar to the scrubber 1 described above with reference to FIGS. 3a and 3b, the only exceptions being the arrangement of the measuring points 101, 102, and 103 and the collectors 111, 112, and 113. For the sake of clarity, all details of the wet scrubber 1 are not illustrated in FIG. 4. Three measuring points 101, 102, and 103 are positioned downstream of the demister 48 in the outlet zone 6. Collectors 111, 112, and 113 in the form of tubes collect gas from the measuring points 101, 102, and 103 and channel the gas to a sulphur dioxide detecting sensor 105, via a valve system 120. Even though the measuring points 101, 102, and 103 are positioned in the outlet zone, a distance from sections A, B, and C as compared to that of FIGS. 3a and 3b, the measuring points 101, 102, and 103 correspond to sections A, B, and C of the contact zone respectively as a result of the flow of the process gas through wet scrubber 1.

Figure 5:
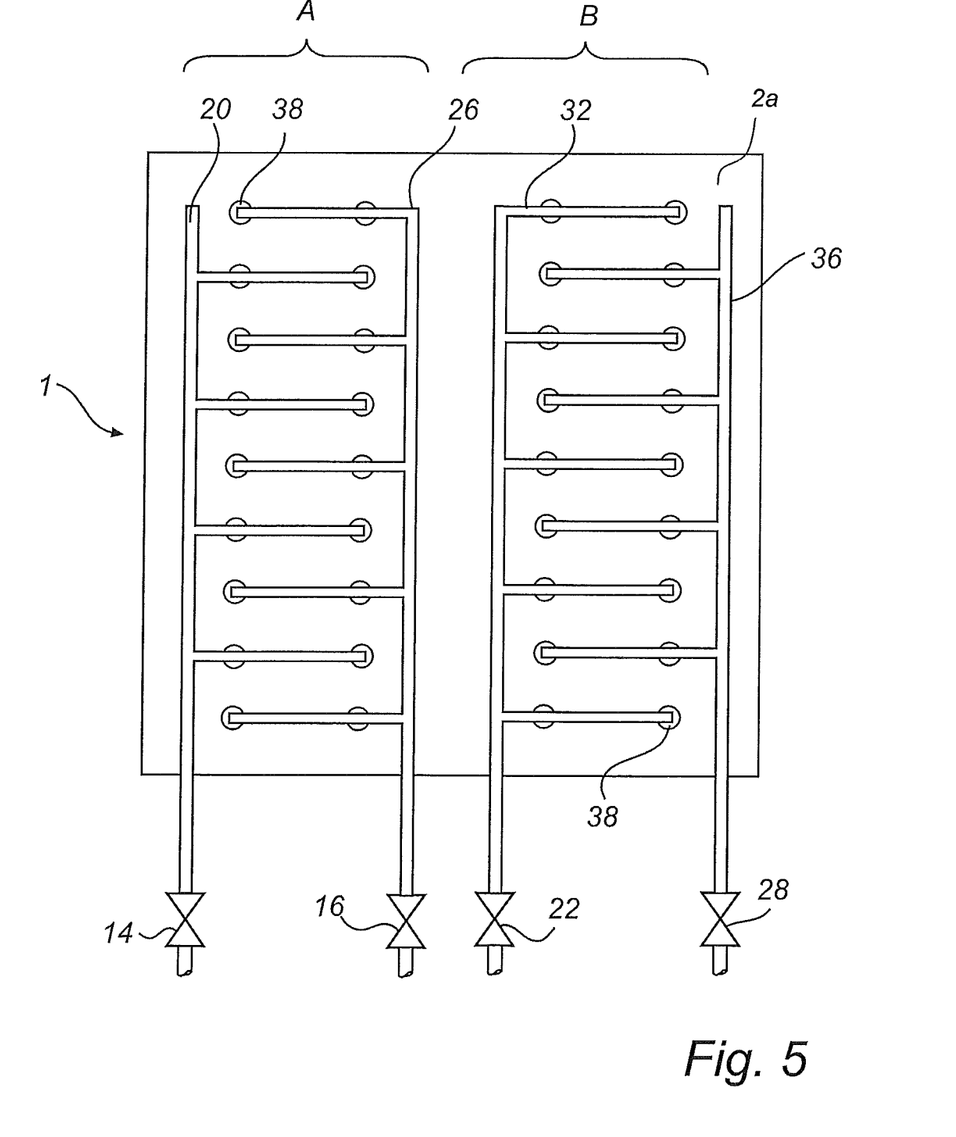
FIG. 5 is a schematic top view of spray level systems.

With reference to FIG. 5 another embodiment is illustrated. FIG. 5 illustrates four spray level systems 20, 26, 32, and 36 positioned in interior 2a of a wet scrubber 1 of spray tower type as viewed from above. Each individual spray level system sprays absorption liquid pumped by pumps 14, 16, 22, 28, respectively, through a plurality of nozzles 38. Spray level systems 20 and 26 are included in section A and spray level systems 32 and 36 are included in section B. Even though the wet scrubber 1 is illustrated having a square cross-section, it is realised that with some modifications the spray level systems 20, 26, 32, and 36 would function also for wet scrubbers with differently shaped cross-sections. The sulphur dioxide removal efficiencies of sections A and B can be individually controlled by adjusting the flow of absorption liquid pumped by the pumps 14, 16, 22, or 28, or by switching off or on any one of the individually functioning pumps 14, 16, 22, or 28.

Figure 6:
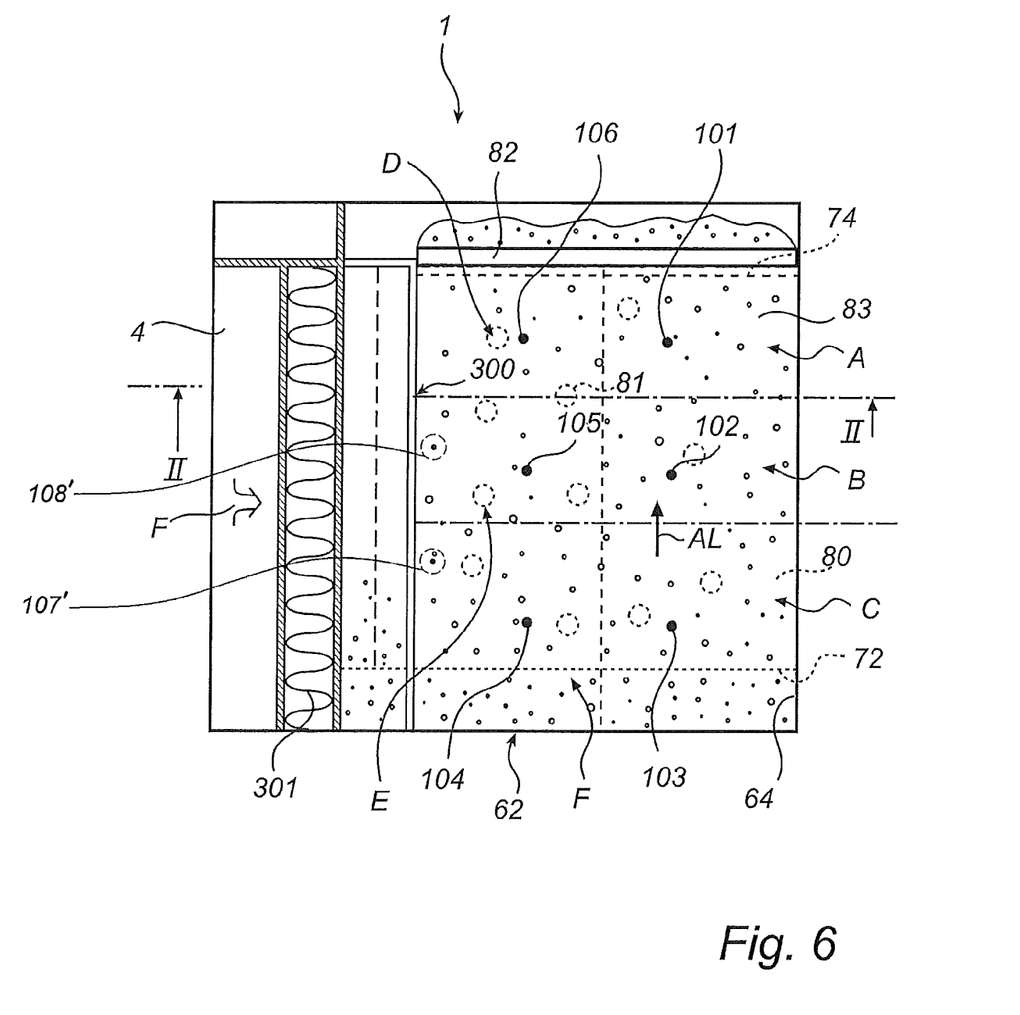
FIG. 6 is a schematic top cross sectional view of a wet scrubber of a bubbling bed type.
Figure 7:
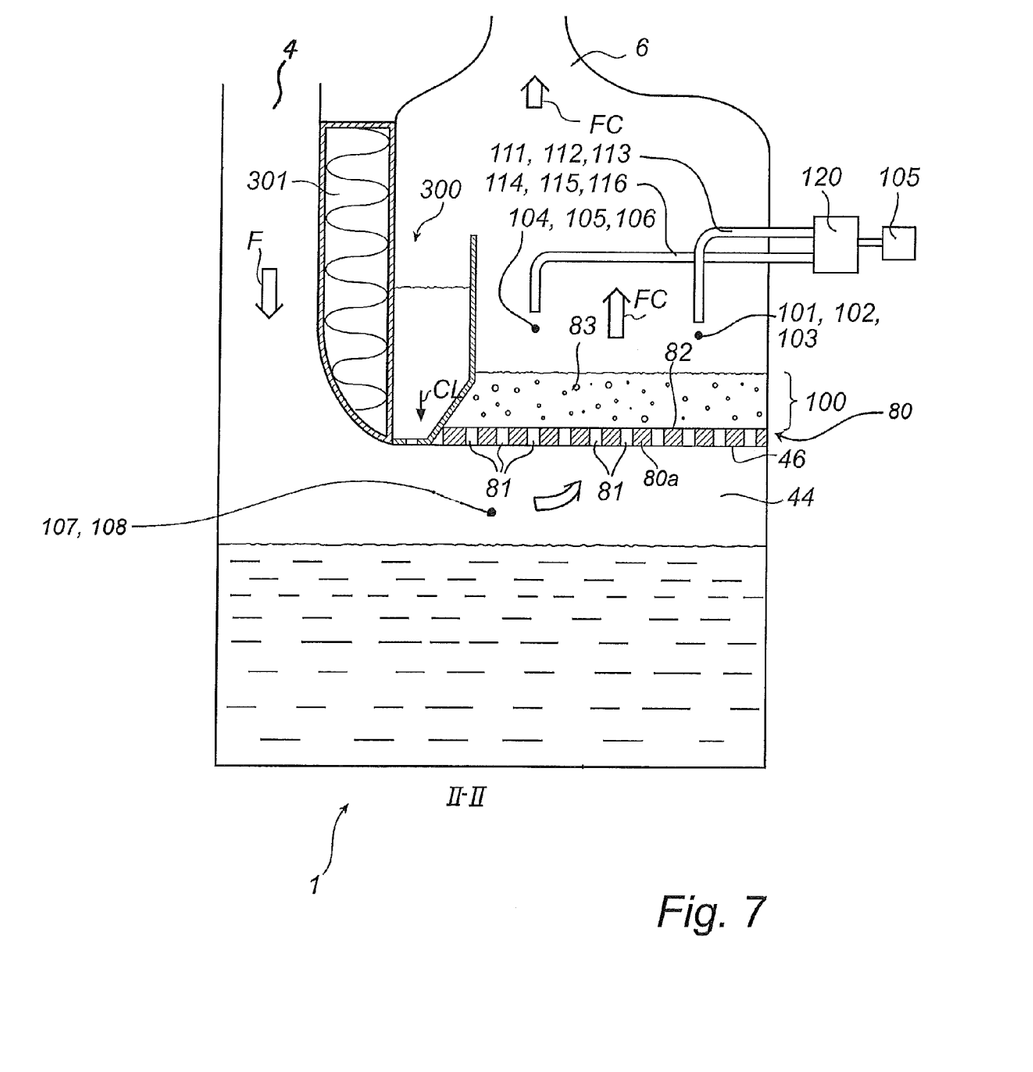
FIG. 7 is a schematic side cross sectional view of the wet scrubber in FIG. 6 taken along line II-II.

With reference to FIGS. 6 and 7 a wet scrubber 1 of a bubbling bed type is discussed. The wet scrubber 1 has an inlet zone 4 for flue gas F from a boiler (not shown). Insulation 301 and a quencher 300 are illustrated in FIG. 7, the insulation not being further discussed. The flue gas F flows through contact zone 100 comprising a plurality of apertures 81 in a horizontal plate 80a, referred to hereinafter as apertured plate 80. The apertured plate 80 has a number of apertures 81, through which the flue gas F can pass. On upper side 82 of apertured plate 80 flows a flowing layer 83 of absorption liquid moving in a direction from the bottom to the top of the illustration of FIG. 6. As the flue gas F passes through the flowing layer 83 of absorption liquid, sulphur dioxide is separated from the flue gas F in the contact zone 100. The thus cleaned flue gas FC leaves the wet scrubber 1 through an outlet zone 6. Measuring points 101, 102, 103, 104, 105, and 106 are positioned above the contact zone 100. Collectors 111, 112, 113, 114, 115, and 116, illustrated in FIG. 7, in the form of tubes collect gas from the measuring points 101, 102, 103, 104, 105 and 106 and transport the gas to a sulphur dioxide detecting sensor 105, also illustrated in FIG. 7. Thus, in this example a single sensor 105 serves a plurality of measuring points. A valve, pump or suction system 120 may be employed for the purpose, as illustrated in FIG. 7. It is realised that each measuring point 101, 102, 103, 104, 105, and 106 could each have been connected to an individual sensor 105. Each measuring point 101, 102, 103, 104, 105, and 106 respectively corresponds to sections A, B, C, F, E, and D illustrated in FIG. 6. In addition the sulphur dioxide concentration is measured globally upstream of the wet scrubber 1 (not illustrated) for reference purposes. During operation of the wet scrubber 1, the concentration of sulphur dioxide is measured in each measuring point 101, 102, 103, 104, 105, and 106, and compared to the measured global concentrations. If a comparison between the concentration determined for each of the measuring points and the reference values indicates that the sulphur removal in one or several of the sections A, B, C, D, E, and F, for example, is insufficient, for purposes of example the one of the following may be concluded:

If the concentration of sulphur dioxide is increasing along the measuring points according to the measuring points' positions along the down stream path with respect to the flowing layer 83 of absorption liquid, the flow may be too low or the layer too thin, whereby the absorption liquid is becoming saturated with sulphur dioxide. The remedy may for example be to increase the flow or the layer thickness. If the concentration of sulphur dioxide is higher in a contact zone section next to another contact zone section, such as higher in B than in E, or higher in D than in A, it may be an indication of the flowing layer 83 being blocked or flowing unevenly over the upper side 82 of the apertured plate 80, thus not flowing over all apertures of, in this example, sections B or D, with resulting insufficient removal of sulphur dioxide.

With reference to FIGS. 6 and 7 one alternative embodiment is hereby discussed: The quencher 300 may be viewed as a part of the contact zone. The absorption liquid supplied from the quencher 300 removes sulphur dioxide from the flue gas F by absorption. In this example two measuring points 107 and 108 are positioned downstream of the spray (spray not illustrated) from the quencher at a distance from each other. Thus, the sulphur dioxide removal efficiency or the performance of the quencher may be locally determined. Measuring points 107 and 108 are positioned upstream of the aperture plate 80, measuring points 107 and 108 are thereby not present in FIG. 6, but their respective positions are indicated as 107' and 108'.

In accordance with one embodiment there may be provided a method for cleaning and for monitoring a cleaning of a process gas passing through a wet scrubber, the wet scrubber comprising an inlet zone, a contact zone and an outlet zone, the contact zone divided into at least two sections positioned in a plane perpendicular to a direction of process gas flow through the contact zone, the process gas flowing through the inlet zone and into the contact zone for mixing with an absorption liquid within the wet scrubber, the absorption liquid absorbing at least part of a sulphur dioxide content of the process gas, the process gas then flowing out of the wet scrubber via the outlet zone, the method comprising: measuring a concentration of sulphur dioxide in at least a first measuring point corresponding to a first section of the at least two sections of the contact zone to obtain measurement information; and comparing the measurement information to a reference value for determining a local sulphur dioxide removal performance of the first section.

In accordance with one embodiment there may be provided a gas cleaning system for cleaning a process gas, comprising a wet scrubber for separating sulphur dioxide from the process gas passing through the wet scrubber by contact with an absorption liquid within a contact zone within the wet scrubber; at least one sulphur dioxide detecting sensor; and at least a first measuring point; wherein the first measuring point corresponds to a first section of at least two sections of the contact zone; and the at least one sulphur dioxide detecting sensor being adapted to measure a concentration of sulphur dioxide in the first measuring point to obtain measurement information to determine a local sulphur dioxide removal performance of the first section.

In accordance with one embodiment there is provided the use of the system according to the second aspect for determining a malfunction in the operation of one section of at least two sections of a wet scrubber.

To summarize, the present disclosure is directed to a method for monitoring a cleaning of a process gas passing through a wet scrubber. The wet scrubber comprises an inlet zone, a contact zone and an outlet zone. The contact zone is divided into at least two sections. The method comprises measuring a concentration of sulphur dioxide in at least a first measuring point corresponding to a first section of the at least two sections of the contact zone to obtain measurement information; and comparing the measurement information to a reference value to determine a local sulphur dioxide removal performance of the first section.

While the invention has been described and illustrated with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment described and illustrated herein as being the best mode contemplated for carrying out this invention, but that the invention will include all embodiments falling within the scope of the appended claims. Moreover, the use of the terms first, second, etc. are not intended to denote any order or importance, but rather the terms first, second, etc. are employed herein simply as a means of distinguishing one element from another.

The invention claimed is:

1. A method for cleaning and for monitoring a cleaning of a process gas passing through a wet scrubber, the wet scrubber comprising an inlet zone, a contact zone and an outlet zone, the contact zone divided into at least two sections, the process gas flowing through the inlet zone and into the contact zone for mixing with an absorption liquid within the wet scrubber, the absorption liquid absorbing at least part of a sulphur dioxide content of the process gas, the process gas then flowing out of the wet scrubber via the outlet zone, the method comprising:
measuring a concentration of sulphur dioxide in at least a first measuring point corresponding to a first section of the at least two sections of the contact zone to obtain measurement information; and
comparing the obtained measurement information to a reference value for determining a local sulphur dioxide removal performance of the first section.

2. The method according to claim 1 further comprising utilizing the local sulphur dioxide removal performance to determine a need for an action to regulate a local operating condition of the first section.

3. The method according to claim 1 further comprising utilizing the local sulphur dioxide removal performance to determine a need for an action to regulate a local operating condition of the first section, wherein the action to regulate the local operating condition of the first section is at least one of:
increasing or decreasing the amount of absorption liquid supplied to the first section of the contact zone;
increasing or decreasing a concentration of a reagent in the absorption liquid of the first section of the contact zone;
increasing or decreasing an amount of process gas supplied to the first section of the contact zone; and
cleaning, replacing, or rebuilding equipment of the wet scrubber corresponding to the first section.

4. Method according to claim 1 further comprising controlling absorption of sulphur dioxide in the first section of the contact zone based on local sulphur dioxide removal performance.

5. The method according to claim 1 further comprising controlling absorption of sulphur dioxide in the first section of the contact zone based on local sulphur dioxide removal performance wherein the controlling absorption is through at least one of:
increasing or decreasing the amount of absorption liquid in the first section of the contact zone;
increasing or decreasing the concentration of a reagent in the absorption liquid in the first section of the contact zone; and
increasing or decreasing an amount of process gas flowing to the first section of the contact zone.

6. The method according to claim 1, wherein a concentration of sulphur dioxide is measured downstream of the contact zone.

7. The method according to claim 1, wherein a reference value is selected from the group consisting of:
a concentration of sulphur dioxide in the process gas upstream of the wet scrubber;
a concentration of sulphur dioxide in the process gas downstream of the wet scrubber;
a concentration of sulphur dioxide in the contact zone measured in a measuring point corresponding to a second section of the at least two sections; and
a predetermined value.

8. The method according to claim 1 further comprising measuring the concentration of sulphur dioxide in at least a first, a second and a third measuring point corresponding to a respective first, second and third section of the contact zone to obtain measurement information.

9. The method according to claim 1 further comprising measuring the concentration of sulphur dioxide in at least a first, a second and a third measuring point corresponding to a respective first, second and third section of the contact zone to obtain measurement information and comparing the measurement information to reference values to determine a need for action to modify a local operating condition in any of the first, second and third sections.

10. The method according to claim 1, wherein the action to modify the local operation condition is through controlling by at least one of:
increasing or decreasing the amount of absorption liquid in the first section of the contact zone;
increasing or decreasing the concentration of a reagent in the absorption liquid in the first section of the contact zone; and
increasing or decreasing an amount of process gas flowing to the first section of the contact zone.

11. The method according to claim 1, wherein the wet scrubber is a wet scrubber of the open spray tower type and wherein each of the at least two sections comprises at least one nozzle adapted for spraying absorption liquid.

12. The method according to claim 1, wherein the wet scrubber further comprises at least one demister positioned downstream of the contact zone and concentration of the sulphur dioxide is measured downstream of the demister.

13. The method according to claim 1, wherein the wet scrubber comprises a first demister and a second demister arranged in series and the concentration of the sulphur dioxide is measured downstream of the second demister.

14. The method according to claim 1, wherein the wet scrubber is of a bubbling bed type of scrubber wherein the contact zone comprises:
a plate with a plurality of apertures for passage of process gas from the inlet zone to the outlet zone through the apertures;
sections comprising at least one of the apertures; and
a layer of absorption liquid flowing over an upper side of the plate.

15. The method according to claim 1, wherein the wet scrubber further comprises at least one sulphur dioxide detecting sensor positioned in measuring points for measuring the concentration of sulphur dioxide.

16. The method according to claim 1, wherein the wet scrubber further comprises at least one sulphur dioxide detecting sensor, and at least one collector, the method further comprising the step of
collecting gas from the at least one measuring point by means of the at least one collector and transporting the gas to the at least one sulphur dioxide detecting sensor.

17. A gas cleaning system for cleaning a process gas, comprising:
a wet scrubber for separating sulphur dioxide from the process gas passing through the wet scrubber by contact with an absorption liquid within a contact zone within the wet scrubber;
at least one sulphur dioxide detecting sensor; and
at least a first measuring point; wherein
the first measuring point corresponds to a first section of at least two sections of the contact zone, and the at least one sulphur dioxide detecting sensor is operable to measure a concentration of sulphur dioxide in the first measuring point to obtain measurement information to determine a local sulphur dioxide removal performance of the first section of the contact zone.

18. The gas cleaning system according to claim 17, further comprising a controller to utilize measurement information to determine a need to modify the local operating condition in one of the at least two sections of the contact zone to which the at least one measuring point corresponds.

19. The gas cleaning system according to claim 17, further comprising a controller wherein the controller is adapted to determine a need to modify at least one local operating parameter of the wet scrubber in the first section.

20. The gas cleaning system according to claim 17 further comprising a controller and a control device used for at least one of:
increasing or decreasing the amount of absorption liquid in the first section of the contact zone;
increasing or decreasing the concentration of a reagent in the absorption liquid in the first section of the contact zone;
increasing or decreasing an amount of process gas in the first section of the contact zone.

21. Use of the system according to claim 17 for determining a malfunction in the operation of one section of at least two sections of a wet scrubber.

* * * * *